United States Patent Office

2,819,171
Patented Jan. 7, 1958

2,819,171

HYDRAULIC CEMENT COMPOSITIONS AND METHOD OF MAKING SAME

Edward W. Scripture, Jr., St. James, Barbados, British West Indies, and Stephen W. Benedict, Cleveland Heights, Ohio, assignors, by mesne assignments, to American-Marietta Company, Chicago, Ill., a corporation of Illinois No Drawing. Application August 19, 1954
Serial No. 451,032

13 Claims. (Cl. 106—90)

This invention relates to hydraulic cement compositions, such as dry cements and concrete or mortar mixes made therefrom, and to compositions for addition to hydraulic cement or to concrete or mortar mixes containing hydraulic cement to improve the compressive strengths of the mixes at all ages, to plasticize the mixes, and to lend other desirable properties thereto.

The principal object of the invention is to provide suitable addition agents for increasing the rate of hardening and the strengths of concrete or mortar mixes at all ages from one day on.

A further object of the invention is to provide addition agents for increasing the strengths of concrete or mortar mixes at all ages while enabling them to be made to a given consistency with a relatively lower water-cement ratio than is possible with a plain concrete or mortar mix having the same proportion of cement and aggregates.

More specifically, it is an object of the invention to provide indurating compositions for hydraulic cement concrete or mortar mixes which will accelerate the hardening of cement, and increase the compressive strength of the mixes at all ages, while imparting greater plasticity to the initial mixes prepared with a given water-cement ratio or produce the desired plasticity with a reduced water-cement ratio compared to a plain concrete or mortar mix having the same proportion of cement and aggregates.

The above and other objects of the invention are achieved by incorporating three essential ingredients into hydraulic cement mixes, in small, controlled proportions. One of these essential ingredients is a compound which will produce ions in solution containing the gluconic radical, such as gluconic acid itself, sodium gluconate, calcium gluconate, and glucono delta lactone, hereinafter called "gluconic compounds." Another of these essential ingredients is salicylic acid or one of its alkaline or alkaline earth metal salts, such as sodium salicylate, calcium salicylate, etc., which produce ions in solution containing the salicylate radical hereafter called "salicylic compounds." The third of these essential ingredients is a chloride salt accelerator, such as the various water-soluble metal chlorides and ammonium chloride. Of this class of compounds, the alkali and alkaline earth metal chlorides are preferred, calcium chloride being generally most suitable because of its low cost.

When all three types of these essential ingredients are employed in combination in accordance with the present invention, they appear to perform quite different functions than when they are used individually, or they are in some manner activated by each other, as will hereinafter more clearly appear. In combination with each other, they produce results that would not be expected from anything known about their individual properties.

In carrying out the present invention, the gluconic compound may be employed in an amount by weight, based on the weight of hydraulic cement, of from .01% to .1%, preferably from .02% to .05%. Below .02%, the effect becomes substantially less, and above .05%, any additional benefit is so slight that the use of larger amounts becomes uneconomical. When used without the other essential ingredients of the invention, the gluconic compounds have severe retarding effects on the initial setting of cement, and lower the early strengths of cement mixes in spite of producing improvements in 28 day strengths. This retardation is so great as to make the use of larger amounts than about .1% impractical for most hydraulic cement applications, whether or not the gluconic compounds are used in combination with the other essential ingredients of the invention.

The salicylic compounds may be employed in accordance with the invention in an amount by weight of from .05% to .25% or .35% of the hydraulic cement, preferably from .06% to .20%. The lowest figure of .06% represents the approximate amount of such a compound at which the invention becomes materially effective. Above the highest figure of .35%, the invention continues to be very effective, but further improvement from the use of larger amounts is so slight as to be uneconomical. When used in any amounts up to as high as .1%, but without the other essential ingredients of the invention, the salicylic compounds have substantially no effect on the strengths of hydraulic cement mixed up to 7 days and more.

The chloride accelerator may be employed in accordance with the invention in an amount by weight of from .05% to .3% or .4% of the hydraulic cement, preferably from .1% to .2%, the specified high and low figures being based upon the same considerations as in the case of the salicylic compound. Amounts of chloride accelerator up to 2% or even 3% or 4% do not impair the operation of the invention. The excess above about .4% generally serves no useful purpose, though, in special situations, as in cold weather concreting, such large amounts may be employed to advantage.

While calcium chloride and similar compounds are commonly used in the art to decrease the setting time of cement mixes and to accelerate the early rate of hardening, they are generally used for this purpose in substantial amounts of 1% or more by weight of the cement. To counteract the delayed setting time experienced in cold weather, it is customary to use in the neighborhood of 2% calcium chloride or more by weight of the cement. While small amounts such as .2% do have some accelerating effect, this effect is relatively small as shown hereinafter.

When the three essential ingredients are incorporated together in an hydraulic cement concrete or mortar mix, the combined amounts by weight of the three additives, based on the hydraulic cement, may range from a minimum of about .15%, which gives appreciable improvement, to about .75%, at which point further additions would be uneconomical and might produce some undesirable results (except as larger amounts of a chloride accelerator might be used for special purposes, as noted above). The preferred total addition is from about .18% to about .35% for the great majority of purposes.

The three essential ingredients may be added to a concrete or mortar mix in the form of an aqueous solution, an aqueous paste, or a dry powder, whichever is most convenient or economical. These ingredients, in proper amounts, may also be mixed with the dry cement or ground with the cement at the time of its manufacture if the maximum grinding temperature is limited to prevent decompositon of the additives. If desired, these ingredients, alone or together with other additives, may be added to any of the other components of a hydraulic cement mix, at any time prior to mixing or during mixing and prior to completion thereof.

The hydraulic cement mixes with which this invention may be employed to advantage include those in which any hydraulic cement of the character of portland cement is the principal cementitious composition, the amounts of the essential ingredients of the invention being governed by the amount of this type of cement present in the mix. Any of the common aggregates and fillers may be employed in various proportions to meet different structural requirements. These include stone, gravel, slag, sand, pozzolanic materials, fly-ash, and the like, and such specialized materials as metallic aggregates, aluminum powder, etc. The invention is also applicable to neat cement mixes containing no aggregate or filler. All such mixes are comprehended hereinafter by the term "hydraulic cement mix." In cases where pozzolanic materials are employed in the presence of soluble calcium salts, the combination has some hydraulic cement characteristics, but would not be considered as a hydraulic cement in determining the amounts of additives employed in accordance with this invention.

As indicated above, the invention does not preclude the use of other additives, as well as aggregates and fillers, for modifying various characteristics of the mixes for special purposes. For example, air entraining agents, cement dispersing agents, pigments, water-repellent compounds, etc. may also be used. The term "consisting essentially of" is intended to be used accordingly in the appended claims.

For purposes of illustration, and not by way of limitation, the following examples are given of hydraulic cement mixes prepared in accordance with the invention, together with various comparative tests and data showing the advantages of the invention and the surprising character of the results achieved thereby.

*Example 1*

Two separate cement mixes were prepared, each mixture comprising Portland cement, sand, coarse aggregate, and water to produce a nominal slump of 4½ inches, and having a nominal cement factor of 5 sacks of cement per cu. yd. Mix No. 1 served as a control and did not contain any addition. To mix No. 2 was added .35%, based on the weight of the cement, of a mixture consisting of 5 parts of glucono delta lactone, 10 parts of sodium salicylate, and 20 parts of calcium chloride. The amounts of these three ingredients individually based on the weight of the cement were respectively .05%, .10%, and .20%. From each concrete mix, 6" x 12" cylinders were prepared and tested for compressive strength in accordance with standard procedures. The pertinent data, including water-cement radio (W/C) in terms of gallons of water per sack of cement, cement factor (C. F.) in terms of sacks of cement per cu. yd. of concrete, plasticity as measured by the slump, air contents by volume as measured in a Washington type air meter, and compressive strengths in lbs./sq. in. at 1, 7, and 28 days, are shown in the following table:

| Mix Nos. | Slump, in. | C. F., sks./ cu. yd. | W/C, gals./ sk. | Air, percent | Compressive strength, p. s. i. | | |
|---|---|---|---|---|---|---|---|
| | | | | | 1 day | 7 days | 28 days |
| 1 | 4 | 4.95 | 7.03 | 1.7 | 530 | 2,700 | 4,460 |
| 2 | 4 | 5.02 | 6.12 | 2.4 | 1,220 | 4,700 | 5,930 |

As would be expected from the great increase in 1 day strength in mix No. 2, the finishing time was substantially reduced.

The 33% increase in 28 day strength, from 4460 p. s. i. to 5930 p. s. i., obtained in the above example, would be an excellent accomplishment if the 1 and 7 day strengths had remained unchanged. While greater increases in 28 day strength can be produced by other methods, they have heretofore been achieved only at the sacrifice of one or both of the properties of early finishing time and early strengths. To achieve this 33% increase in 28 day strength and, at the same time, increase the 1 day strength from 530 p. s. i. to 1220 p. s. i. (130%) and the 7 day strength from 2700 p. s. i. to 4700 p. s. i. (74%) is most remarkable.

That such results can be achieved by the use, together, of the three essential ingredients of the invention is surprising and wholly unpredictable from their effects when used alone. This will be better appreciated from the following data on their individual effects:

Glucono delta lactone and sodium salicylate, used alone or together, in the amounts of Example 1 have no marked effect on the early rate of gain in strength, the glucono delta lactone actually having a retarding effect when used alone. For example, an addition to a concrete mix of only glucono delta lactone in the amount of .05% by weight of the cement, reduced the 1 day strength from 500 p. s. i. without the addition to 420 p. s. i. with the addition. In another series of tests of the same general character but different mix proportions, the retarding effect of additions of larger amounts of glucono delta lactone were as shown in the following table:

| Percent glucono delta lactone | Water, gals/sack | Slump, in. | Compressive strength, p. s. i., 1-day |
|---|---|---|---|
| None | 6.50 | 4 | 780 |
| .10 | 5.56 | 4½ | 680 |
| .15 | 5.48 | 5 | 0 |
| .20 | 5.37 | 4½ | 0 |

The lack of any substantial increase or decrease in early strengths resulting from additions of a salicyclic compound alone are shown by the following table setting forth the results of adding salicylic acid alone to a cement mix in the amount of .1% based on the weight of the cement:

| Material added to mix | Compressive strengths, lbs./sq. in. | | |
|---|---|---|---|
| | 1 day | 3 days | 7 days |
| None | 1,337 | 3,054 | 5,566 |
| .1% salicyclic acid | 1,369 | 3,086 | 5,875 |

That the addition of salicylic compounds alone has no appreciable effects on early strengths of cement mixes has long been known in the art.

Although calcium chloride in amounts of 1% to 3% does greatly increase the early rate of gain in strength, its addition alone in the small amount of .2% to mix No. 1 in the above Example 1 gave an increase in 1 day strength from the 530 p. s. i. of Example 1 to only 760 p. s. i., an increase of 43.5%. However, the presence of the retarding gluconic and the non-accelerating salicylic compounds with but .2% of calcium chloride in mix No. 2 of the above example produced a 1 day strength of 1200 p. s. i., or an increase of 130%.

The following additional example is given to illustrate variations in the relative proportions of the three essential ingredients of the invention, in the total amount of the three ingredients, and in the results achieved thereby.

*Example 2*

Two separate cement mixes were prepared, each mixture comprising Portland cement, sand, coarse aggregate, and water to produce a nominal slump of three inches, and having a nominal cement factor of five sacks of cement per cu. yd. Mix No. 1 served as a control and did not contain any addition. To mix No. 2 was added .25%, based on the weight of the cement, of a mixture consisting of two parts of glucono delta lactone, 15 parts of sodium salicylate, and eight parts of calcium chloride. The amounts of these three ingredients individually based on the weight of the cement were respectively .02%, .15% and .08%. From each concrete mix, cylinders were prepared and tested for compressive strength in the same manner as in Example 1, the various pertinent data being reported in the same manner in the following table:

| Mix Nos. | Slump, in. | C. F., sks./ cu. yd. | W/C, gals./ sk. | Air, percent | Compressive strength, p. s. i. | | |
|---|---|---|---|---|---|---|---|
| | | | | | 1 day | 7 days | 28 days |
| 1 | 3 | 4.90 | 7.30 | 1.8 | 570 | 2,190 | 4,430 |
| 2 | 3¼ | 4.96 | 6.55 | 2.5 | 1,030 | 3,770 | 5,600 |

In this example, compared to Example 1, the relative amounts of the three ingredients were varied considerably and the total amount of all three of them together was substantially reduced with more or less reduction in the percentage improvement in compressive strength at 1, 7, and 28 days, though the improvement in the strength at seven days was almost as great as in Example 1.

The remarkable increase in 1 day strength and also in 7 day strength (74%) produced by this invention is a most valuable result in enabling the early stripping of forms from concrete structures and the early application of loads thereto in the course of continued construction. The rapid initial set permitting a shortened finishing time is another valuable advantage of this invention, particularly when used to produce floor slabs and the like.

From the foregoing discussion, it will be seen that the combination of very small amounts of the three essential compounds of the invention produce gains in strength at all ages which cannot be attributed to the sum of their individual effects but must involve an interaction or synergistic action between them.

In addition, it will be observed that the combination of the three essential ingredients of the invention exert a substantial plasticizing action on cement mixes, permitting a pronounced reduction in the water-cement ratio while retaining substantially the same plasticity as indicated by the slump data. Also, as will be noted from the examples, the three essential ingredients of the invention together, have some air entraining characteristics. In both examples the amount of entrained air in the mixes resulting from the use of these ingredients, was increased approximately 40%.

It will be appreciated that considerable variation in the total and relative amounts of the three essential ingredients of the invention is permissible, while retaining the benefits of the invention to a substantial degree. It will also be appreciated that any of the members of the three classes of essential ingredients disclosed here may be substituted, one for another, and that they may be incorporated into hydraulic cement mixes by many different procedures. Accordingly, the invention is not limited to the specific examples described by way of illustration, but is intended to include all such variations as would occur to one skilled in the art, within the true spirit and scope of the appended claims.

Having described our invention, we claim:

1. A hydraulic cement composition consisting essentially of a Portland type hydraulic cement, sufficient water to effect hydraulic setting of the cement and produce a workably plastic mix, and from .01 to .1% of a gluconic compound selected from the class consisting of gluconic acid, its water-soluble salts, and glucono delta lactone, from .05% to .35% of a salicylic compound selected from the class consisting of salicylic acid and its water-soluble salts, and from .05% to 4.0% of a water-soluble chloride accelerator, all by weight based on the weight of said cement.

2. A hydraulic cement composition according to claim 1 in which the gluconic compound is glucono delta lactone.

3. A hydraulic cement composition according to claim 1 in which the gluconic compound is glucono delta lactone, and the salicylic compound is sodium salicylate.

4. A hydraulic cement composition consisting essentially of a Portland type hydraulic cement, sufficient water to effect hydraulic setting of the cement and produce a workably plastic mix, and from .02% to .05% of a gluconic compound selected from the class consisting of gluconic acid, its water-soluble salts, and glucono delta lactone, from .06% to .20% of a salicyclic compound selected from the class consisting of salicyclic acid and its water-soluble salts, and from .1% to .4% of a water-soluble chloride accelerator, all by weight based on the weight of said cement.

5. A hydraulic cement composition according to claim 4 in which the gluconic compound is glucono delta lactone.

6. A hydraulic cement composition according to claim 4 in which the salicylic compound is sodium salicylate.

7. An additive for Portland type hydraulic cement mixes consisting essentially of from 1 to 10 parts of a gluconic compound selected from the class consisting of gluconic acid, its water-soluble salts and glucono delta lactone, from 5 to 35 parts of a salicylic compound selected from the class consisting of salicylic acid and its water-soluble salts, and from 5 to 400 parts of a water-soluble chloride accelerator, all by weight.

8. An additive according to claim 7 in which the gluconic compound is glucono delta lactone.

9. An additive according to claim 7 in which the gluconic compound is glucono delta lactone and the salicylic compound is sodium salicylate.

10. An additive for Portland type hydraulic cement mixes consisting essentially of from 2 to 5 parts of a gluconic compound selected from the class consisting of gluconic acid, its water-soluble salts and glucono delta lactone, from 6 to 20 parts of a salicylic compound selected from the class consisting of salicylic acid and its water-soluble salts, and from 10 to 40 parts of a water-soluble chloride accelerator, all by weight.

11. An additive according to claim 10 in which the gluconic compound is glucono delta lactone.

12. A hydraulic cement composition according to claim 10 in which the salicylic compound is sodium salicylate.

13. An additive according to claim 10 in which the gluconic compound is glucono delta lactone and the salicylic compound is sodium salicylate.

References Cited in the file of this patent

UNITED STATES PATENTS

| 2,264,336 | Scripture | Dec. 2, 1941 |
| 2,588,248 | Klein | Mar. 4, 1952 |